US007404871B2

(12) United States Patent
Huotari et al.

(10) Patent No.: US 7,404,871 B2
(45) Date of Patent: Jul. 29, 2008

(54) METHOD AND DEVICE FOR HOT GLUING

(76) Inventors: Henri Huotari, Suvelantie 18 A 21, Espoo (FI) FIN-02760; Iisakki Huotari, Mannerheimintie 130 A 24, Helsinki (FI) FIN-00270; Jaakko Huotari, Porvarinkuja 1 K 38, Helsinki (FI) FIN-00750; Tari Lauri, Tammihaantie 2 B 13, Espoo (FI) FIN-02940; Markku Siikamaki, Mirjankuja, Espoo (FI) FIN-02230

( * ) Notice: Subject to any disclaimer, the term of this patent is extended or adjusted under 35 U.S.C. 154(b) by 516 days.

(21) Appl. No.: 10/503,030

(22) PCT Filed: Jan. 15, 2003

(86) PCT No.: PCT/FI03/00024

§ 371 (c)(1), (2), (4) Date: Mar. 7, 2005

(87) PCT Pub. No.: WO03/064169

PCT Pub. Date: Aug. 7, 2003

(65) Prior Publication Data

US 2005/0152771 A1 Jul. 14, 2005

(30) Foreign Application Priority Data

Jan. 29, 2002 (FI) ................................ 20020162

(51) Int. Cl.
*B29C 65/00* (2006.01)

(52) U.S. Cl. ............................... 156/295; 412/4; 412/5; 412/8; 270/58.07; 270/58.08

(58) Field of Classification Search ................. 156/196, 156/295, 443, 539, 547, 552, 556; 412/4, 412/5, 8, 19, 20, 21, 33; 270/58.08, 58.07
See application file for complete search history.

(56) References Cited

U.S. PATENT DOCUMENTS 1,741,269 A 12/1929 Alger (Continued)

FOREIGN PATENT DOCUMENTS

DE 119555 A1 5/1976

(Continued)

*Primary Examiner*—Richard Crispino
*Assistant Examiner*—Christopher Schatz
(74) *Attorney, Agent, or Firm*—Skinner and Associates

(57) ABSTRACT

The invention relates to a method and device for hot—gluing a bundle (2), particularly in a device that includes a glue reservoir (7) for storing a glue that has been made fluid, a glue-spreading roller (6) for spreading the glue onto the spine surface of the bundle (2), press devices, (3,4,5,2 1, 21') for holding the bundle (2), and possible side-nip devices (16, 19, 20) for finishing the shape of the book. The bundle (2), which is held between two symmetrically positioned press plates (21, 21'), is pressed with the glue-spreading roller (6) to bend or fan out the edge of the bundle (2) and to open a gap between the cover sheet (11) and the outermost sheet of the bundle. The glue is spread to such an extent that a glue bead (13, 14, 15) forms at the gap and at the opposite edge of the bundle (2) and possible also at the bend in the cover sheet, so that the glue beads are spread for a certain distance in the gaps between the cover (11) and the edges of the bundle, in order to form a glue bond during the following side nipping.

4 Claims, 2 Drawing Sheets

U.S. PATENT DOCUMENTS

| | | | |
|---|---|---|---|
| 2,044,365 | A | 6/1936 | Pederson |
| 2,455,971 | A | 12/1948 | Bosch |
| 5,011,187 | A | 4/1991 | Hunder et al. |

FOREIGN PATENT DOCUMENTS

| | | | |
|---|---|---|---|
| DE | 3439984 | A1 | 5/1986 |

METHOD AND DEVICE FOR HOT GLUING

The present invention relates to a method and device for hot gluing a bundle of material in the form of sheets.

Nowadays, hot gluing has become a very popular way to make documents and similar, in which the general principle is that a bundle of sheets, for example, paper sheets, are bound together, usually in a device designed for this purpose.

In the device, there are means for holding the bundle in place, possibly means for roughening the back of the bundle, means for spreading the glue on the spine surface of the bundle, and means for gluing covers onto the sides of the bundle.

On the other hand, hot-gluing devices intended for small jobs are also known, in which a separate handheld device is used to spread the glue.

It is obvious that a handheld device is only suitable for work that is not very demanding. This is because hot gluing often requires quite precise settings, to permit the desired high-quality finished product to be created. This seldom succeeds with a handheld device.

In hot gluing, because the intention is to glue the sheets to each other, even though over a very limited area, the bundle to be glued is bent to the side for a certain distance, thus forming, in a known manner, a small step between adjacent sheets of paper and exposing a small part of the side surface of the sheet to allow the glue to be spread onto it too. This esnures the strength of the gluing. The bending takes place by using flexible supports on either side of the edge of the bundle.

However, the system referred to has the drawback that, in cases in which it is intended to glue a cover or covers, included in the bundle, onto the bundle, for instance, when making books, the gluing of the cover is generally insufficient, when this forced bending takes place with the aid of supports. An attempt can be made to improve this during the process, by manually pulling the sheet of cover material to the side, to open a gap between the cover sheet and the first sheet to be glued. It is obvious that manual operations during work that is otherwise done mechanically takes unnecessary energy and accuracy that could be used better in the other work stages of the process.

It has now been surprisingly invented, that by suitably adapting the previous known method, a total process can be achieved, which no longer has stages requiring the manual pulling of the cover material, and which also surprisingly gives a better result than before, using only conventional operations of the machine. Particularly, when making a book, this achieves excellent gluing of the cover sheet to the rest of the bundle of sheets.

The aforesaid and other advantages and benefits of the present invention are achieved in the manner described as characteristic in the accompanying claims.

In the following, the invention is examined in greater detail with reference to the accompanying patent drawings, which show as a series some of the work stages required to glue bind a bundle of sheets.

Thus

Figure 1:
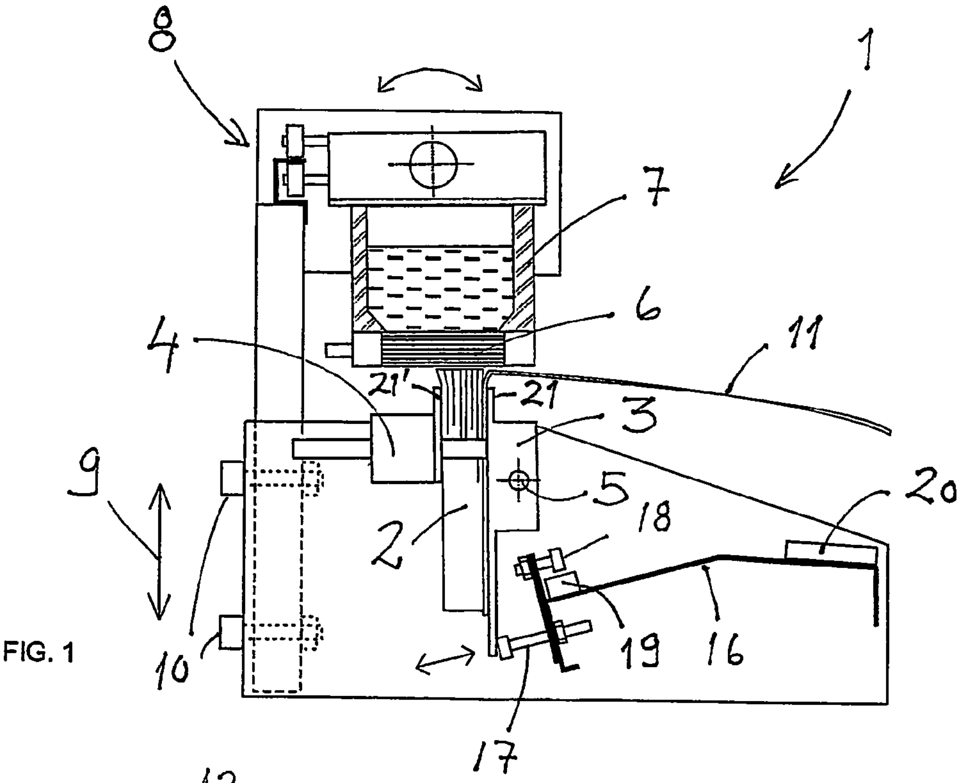
FIG. 1 shows a typical glue-spreading stage according to the present invention, seen from the end of the sheet bundle.

As stated, FIG. 1 shows a device intended to form a hot-glued piece, such as a piece 2 like a book. The sheets 2 to be hot glued are secured to a press bench 3 with the aid of a press bar 4, in such a way that the bundle is held firmly in place between them. In the outermost position on one side of the bundle there is a cover-sheet blank 11. The press bench 3 is rotatably pivoted around a shaft 5, as explained later in greater detail.

On top of the bundle to be glue bound, there is an apparatus for spreading glue on the spine of the bundle. The apparatus includes a glue-spreading roller 6, which, if necessary, can be rotated using a suitable operating device, which is not shown in FIG. 1, for reasons of clarity. The roller may also rotate freely. On top of the roller, there is a glue reservoir 7, which holds the heated glue intended to be used for the gluing. The reservoir 7 with its roller and other accessories is arranged to be movable along an essentially horizontal linear track. The moving apparatus and the track are marked with the general reference number 8 and usually comprise rollers with lightly moving bearings, a track along which the movement takes place, a motor to power the movement, and suitable sprockets, chains, or similar, to transmit the power. It is naturally obvious that the apparatus can be moved by hand, as an alternative to motor-powered movement. Being conventional, this part of the apparatus is not described here in any greater detail.

An arrow 9 is used to show the vertical basic adjustment of the glue-spreading apparatus, which in this case is implemented using screws 10, but which can of course be of any type at all. The glue-spreading roller can also be adjustable vertically, for example, by pivoting it rotatably around an axis parallel to the roller. If necessary, adjustments can also be made by tilting the roller 6. If necessary, there can be several glue rollers. The apparatus can also include one or several separate roughening rollers, if required.

Figure 2:
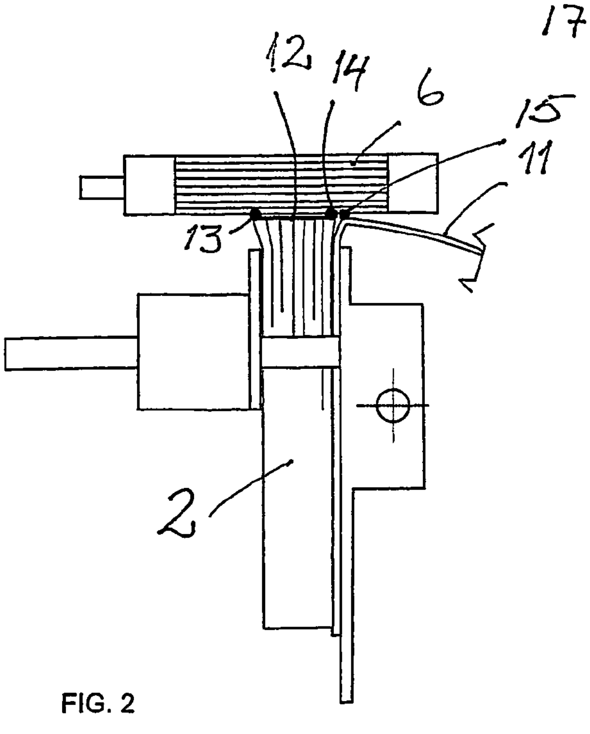
FIG. 2 shows a part of the stage according to FIG. 1, in order to show the behaviour of the edge of the sheet bundle at some settings of the machine.
Figure 3:
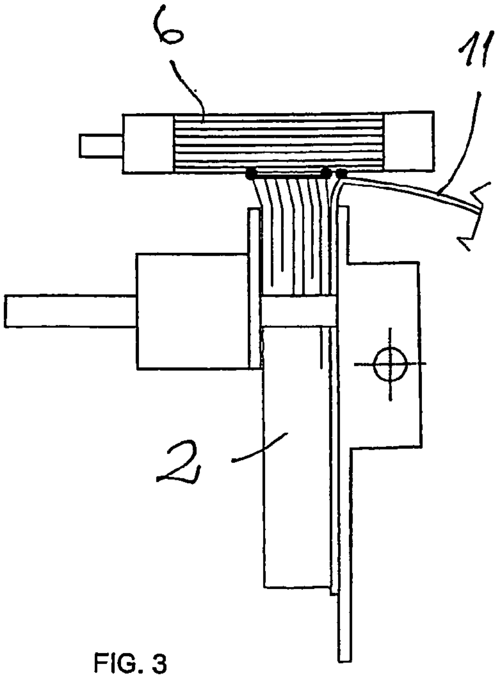
FIG. 3 shows a part figure like that of FIG. 2, when using machine settings slightly different to those above.

FIGS. 2 and 3 show two possible ways for the edge of the bundle 2 to behave, when the device according to the invention is used. The differences are due to the fact that in these embodiments there is a slight difference in the angle of tilt of the roller and/or the height of the roller. However, FIG. 2 and FIG. 3 have in common the feature that the area of the edge of the bundle is essentially unsupported for a certain distance. When the glue-spreading rollers is run along the long edge of the bundle, thus causing a certain amount of pressure on the edge of the bundle, the sheets at the edge of the bundle bend and thus open the gaps between the sheets sufficiently for a small amount of glue to also penetrate between the sheets.

However, the most important aspect is that the cover material 11, which is on the outside of the bundle pressed on the press bench and is folded away from the bundle 2, folds regularly in such a way that a gap opens between the cover material and the outermost sheet of the bundle and the glue forms an accumulation over the edge of the bundle and to the point of contact of the cover material with the roller, thus permitting strong side gluing between these two sheets of material. The strength is due to the additional amount of glue, which also means that the gluing takes place over a greater distance than in the solutions of the state of the art.

In FIGS. 2 and 3, the glue that is to be spread/that spreads is marked with the reference number 12, the accumulated beads being marked with the reference numbers 13, 14, and 15.

Figure 4:
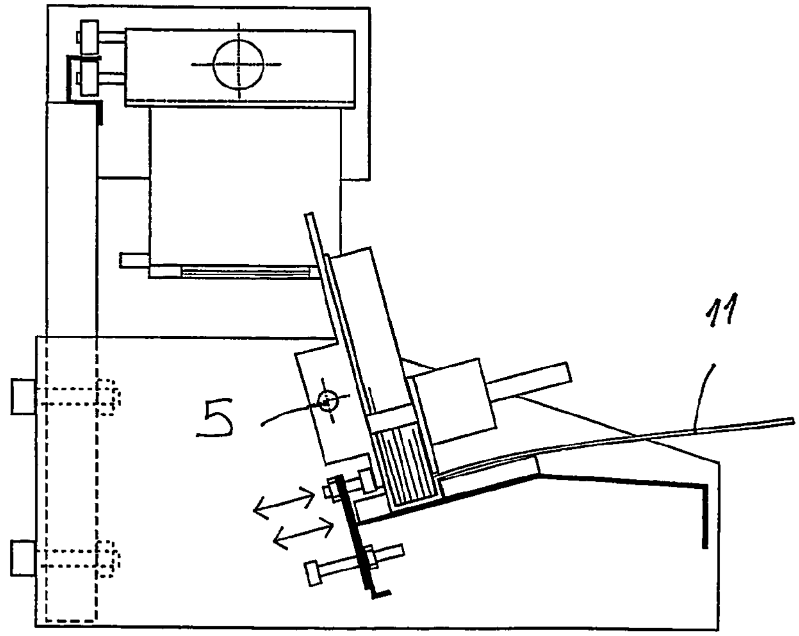
FIG. 4 illustrates the last stage of the glue binding, in which the cover material is finally glued to the edge of the bundle.
Figure 5:
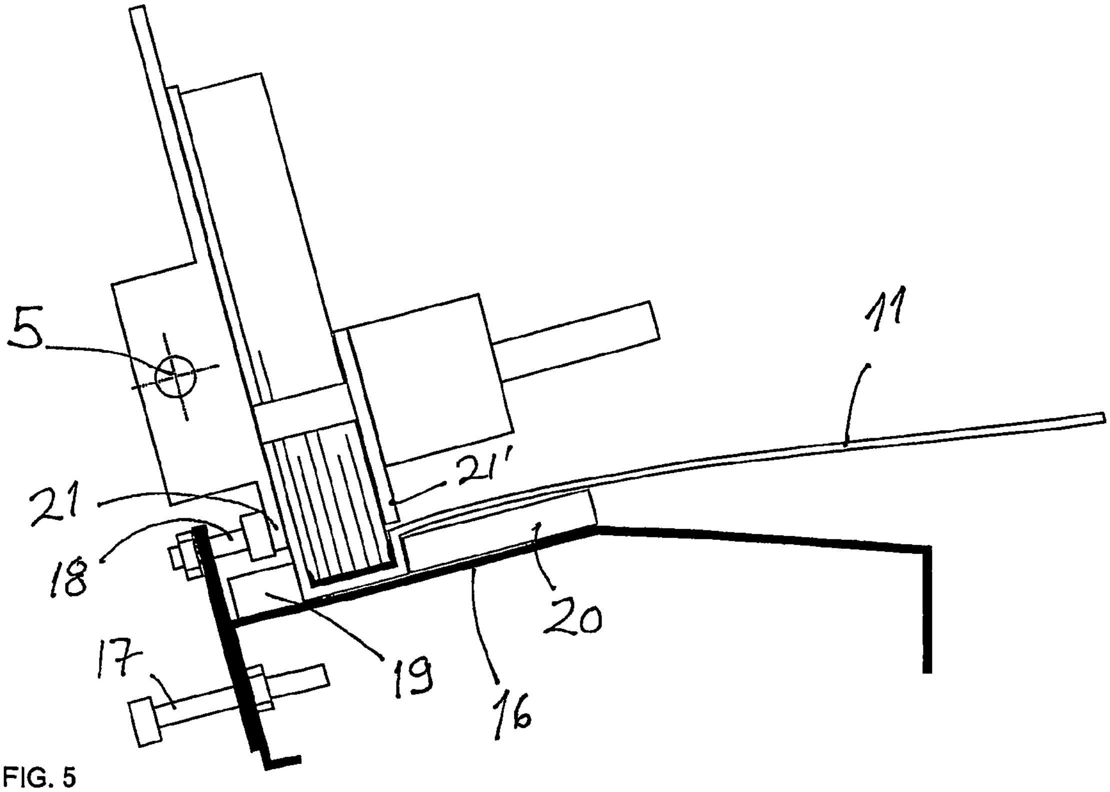
FIG. 5 shows an enlargement of part of FIG. 4.

FIG. 4 and the enlarged FIG. 5 show the final stage of the glue binding, in which the cover material sheet 11 or similar in pressed into place on the other side of the bundle 2 as well. The press bench is, as stated above, pivoted rotatably around a shaft 5. As can be seen in FIG. 1, in the gluing position the bench is adjusted to its extreme position by using adjusting screws 17, on which the edge of the bench rests. The double arrow at the screw 17 in FIG. 1 shows this adjustment. However, there is also another adjustment screw 18, which is intended to position the press bench 3 in its other extreme position. This screw 18 too is adjustable, as shown with the double arrow.

Both adjustment screws 17 and 18 are attached to the edge of a side-nip bench 16. The bench 16 also has a beam or similar support piece 19, against which the press-bench side of the bundle 2 is supported. The precise positioning of the press bench takes place using the screw 18.

The final stages of the gluing process begin once the gluing roller has spread the glue on the back of the bundle 2 as described above. After this, the press bench is turned in a suitable manner, for example, using a lever, which is not shown here, from the position of FIG. 1 to the position of FIG. 4. The free part of the cover 11 is now as shown. Next, the side nip 20, which was originally in the position shown in FIG. 1 at the edge of the bench 16, is moved to the position shown in FIGS. 4/5, so that it presses the sheet of cover material 11 against the edge of the bundle 2. Thus the glue, which is still in a spreading form, particularly in the form of the bead 13 and 14, 15 described above, is pressed between the cover-material sheet and the outermost sheet of the bundle on both sides of the bundle and is squeezed for a certain distance between the said surfaces, starting from the edge. This creates a glued bond, which extends further than normally, thus strengthening the binding and preventing the binding of the book or similar that has been formed from opening right to the edge.

As the final stage, the glued piece that has cooled for a moment and been bound is removed from the press and the free part of the cover is pressed in place at the side of the bundle that has been formed, after which the final finishing operations, such as the final trimming of the book, are carried out, if necessary.

The core of the whole process is that no separate devices are required to bend the bundle or to fan it out. Fanning takes place naturally, when the relatively sturdy press bench/press beam components 21, 21' are used to support the bundle from both sides. These components are particularly completely rigid, or at least sufficiently rigid to only permit a limited degree of bending. The position of the supports during the process is such that the glue-spreading roller 6 can cause a suitable bend in the sheets to spread the glue slightly onto the side surfaces of the sheets as well. In practice, this means a distance of centimetres from the edge of the bundle, usually, for example, a distance of about 1-3 centimetres. Usually, the supports are positioned symmetrically relative to the bundle, i.e. the edges of the supports are essentially at the same distance from the edges of the bundle 2.

The above discloses only one embodiment of the invention, without in any way being restricted to it. Many variations are possible while nevertheless remaining within the scope of the protection of the basic inventive idea and defined in the accompanying claims. For example, in addition to the glue-spreading roller, a separate spreader roller can be used in front of the glue-spreading roller, so that the first roller carries out the opening/fanning out of the back while the second spreads the glue. The glue-spreading roller then does not need to exert as much pressure on the spine of the bundle as it does when operating alone.

The invention claimed is:

1. A method for hot-gluing a bundle, which comprises sheets and a cover blank that initially surrounds the bundle on one side, and for manufacturing a book, particularly in a device that includes a glue reservoir for storing glue that has been made fluid, a glue-spreading roller for spreading the glue onto a spine surface of the bundle, press devices, including two essentially symmetrically positioned press plates for holding the bundle between them, and side-nip devices for finishing the shape of the book, in such a way that the bundle is pressed with the glue-spreading roller to bend or fan out an edge of the bundle, characterized in that the roller is also used to open a gap between the cover blank and an outermost sheet of the bundle and that the glue is spread to such an extent that a glue bead forms at the gap and at an opposite edge of the bundle and also at a bend in the cover blank, and that the glue bead is spread for a certain distance in the gap between the cover blank and the edge of the bundle, in order to form a glue bond during a subsequent side nipping.

2. A method according to claim 1, characterized in that a separate opening roller is also used to fan out the sheets, before or during the spreading of the glue.

3. A method according to claim 1, characterized in that the press plates are either completely rigid or only permit slight bending.

4. A method according to claim 1, characterized in that the position of the glue-spreading roller is adjusted so that the roller causes the bundle to bend/fan out away from the edge at which a cover blank is located in the glue-spreading stage.

* * * * *